United States Patent [19]
Watanabe et al.

[11] Patent Number: 5,481,959
[45] Date of Patent: Jan. 9, 1996

[54] AUTOMATIC AIR BALANCER SYSTEM

[75] Inventors: Masayuki Watanabe; Nobuhiro Fujiwara; Kunihisa Kaneko; Kenji Kanazawa, all of Yawara, Japan

[73] Assignee: SMC Corporation, Tokyo, Japan

[21] Appl. No.: 346,675

[22] Filed: Nov. 30, 1994

[30] Foreign Application Priority Data

Mar. 28, 1994 [JP] Japan ..................... 6-079264

[51] Int. Cl.6 ..................... F15B 13/16; F15B 13/044
[52] U.S. Cl. ................. 91/361; 91/314; 91/366; 91/415; 91/459
[58] Field of Search ............... 91/361, 362, 364, 91/366, 415, 417 R, 459

[56] References Cited

U.S. PATENT DOCUMENTS

| | | | |
|---|---|---|---|
| 4,606,257 | 8/1986 | Pfister | 91/415 X |
| 4,628,499 | 12/1986 | Hammett | 91/361 X |
| 4,712,470 | 12/1987 | Schmitz | 91/361 X |

FOREIGN PATENT DOCUMENTS

| | | | |
|---|---|---|---|
| 4538853 | 12/1970 | Japan | 91/417 R |
| 0192603 | 11/1982 | Japan | 91/361 |
| 1216101 | 8/1989 | Japan | 91/361 |
| 238682 | 9/1993 | Japan . | |

*Primary Examiner*—Edward K. Look
*Assistant Examiner*—Hoang Nguyen
*Attorney, Agent, or Firm*—Brumbaugh, Graves, Donohue & Raymond

[57] ABSTRACT

An automatic air balancer system capable of maintaining various kinds of load at a predetermined position and then moving the load at a desired speed, or applying a desired mechanical force to various kinds of object. The system includes a device for controlling the pressure at one end side of a balance cylinder to a desired level by a first pressure control valve and for controlling the pressure at the other end side of the balance cylinder to a predetermined level by a second pressure control valve, and a device for obtaining a balance pressure signal for the balance cylinder. Another signal is added to or subtracted from the balance pressure signal, and the resulting signal is input to the first pressure control valve.

5 Claims, 1 Drawing Sheet

AUTOMATIC AIR BALANCER SYSTEM

BACKGROUND OF THE INVENTION

The present invention relates to an automatic air balancer system for maintaining various kinds of load at a predetermined position and then moving the load at a desired speed, or outputting a desired mechanical force.

The present applicant filed an application with regard to an invention of an automatic air balancer system (prior invention, i.e., Japanese Patent Application Laid-Open (KOKAI) No. 5-238682), which includes: (a) a device for temporarily holding as an extension start voltage signal the pressure in a balance cylinder when a piston of the balance cylinder travels upward and enters the working range of a position detector; (b) a device for temporarily holding as a contraction start voltage signal the pressure in the balance cylinder when the balance cylinder piston travels downward and re-enters the working range of the position detector; (c) a device for outputting the extension start voltage signal and the contraction start voltage signal, which have been temporarily held, when the balance cylinder piston reaches a lower extremity position, and for obtaining a median of the difference between the extension start voltage signal and the contraction start voltage signal and then adding the contraction start voltage signal to the median; and (d) a device for using a value obtained as a result of the addition of the contraction start voltage signal to the median as a balance pressure signal for the balance cylinder.

It should be noted that the position detector has a distance between a position where the position detector is turned on by approach of the piston and a position where it is turned off by travel of the piston in the reverse direction during the next stroke. The distance is called "differential gap". At present, the differential gap is 2 mm or less in the case of a position detector with contacts and 1 mm or less in the case of a contactless position detector. In the prior invention, the position detector is disposed at a position where the position detector outputs an on-signal by detecting downward travel of the piston (i.e., the lower extremity position of the piston). When the piston travels upward (moves upward) and the travel distance exceeds the differential gap, the position detector outputs an off-signal.

The main purpose of the automatic air balancer system of the prior invention is to move various kinds of load up and down by the balance cylinder and to maintain the piston at a predetermined position by controlling the air pressure in the balance cylinder. Thus, the automatic air balancer system of the prior invention is incapable of moving various kinds of load vertically and horizontally at a desired speed, or applying a desired mechanical force to various kinds of object, and it has no security function that enables the piston to be surely kept suspended when the system is stopped.

SUMMARY OF THE INVENTION

An object of the present invention is to provide an automatic air balancer system which is capable of maintaining various kinds of load at a predetermined position and then moving the load at a desired speed, or applying a desired mechanical force to various kinds of object while preventing the piston rod from springing out of the balance cylinder, and which is designed so that, when the pressure in the balance cylinder exceeds a predetermined level, an alarm is activated, and the pressure air is confined in the balance cylinder.

The present invention provides an automatic air balancer system including a device for controlling the pressure at one end side of a balance cylinder to a desired level by a first pressure control valve and for controlling the pressure at the other end side of the balance cylinder to a predetermined level by a second pressure control valve, and a device for obtaining a balance pressure signal for the balance cylinder. The automatic air balancer system further includes a device for adding or subtracting another signal to or from the balance pressure signal and for inputting the result of the addition or subtraction to the first pressure control valve.

In addition, the present invention provides an automatic air balancer system including a device for controlling the pressure at one end side of a balance cylinder to a desired level by a first pressure control valve and for controlling the pressure at the other end side of the balance cylinder to a predetermined level by a second pressure control valve, and a device for temporarily holding as an extension start voltage signal the pressure in the balance cylinder when a piston rod of the balance cylinder extends and a piston of the balance cylinder comes out of the working range of a position detector. The automatic air balancer system further includes a device for temporarily holding as a contraction start voltage signal the pressure in the balance cylinder when the piston rod contracts and the piston re-enters the working range of the position detector, and a device for outputting the extension start voltage signal and the contraction start voltage signal, which have been temporarily held, when the piston rod reaches a position at the one end of the balance cylinder, and for obtaining a median of the difference between the extension start voltage signal and the contraction start voltage signal and then adding the contraction start voltage signal to the median. Further, the automatic air balancer system includes a device for using a value obtained as a result of the addition of the contraction start voltage signal to the median as a balance pressure signal for the balance cylinder, and a device for adding or subtracting another signal to or from the balance pressure signal and for inputting the result of the addition or subtraction to the first pressure control valve.

In addition, the present invention provides an automatic air balancer system including a device for controlling the pressure at one end side of a balance cylinder to a predetermined level by a second pressure control valve and for controlling the pressure at the other end side of the balance cylinder to a desired level by a first pressure control valve, and a device for temporarily holding as a contraction start voltage signal the pressure in the balance cylinder when a piston rod of the balance cylinder contracts and a piston of the balance cylinder comes out of the working range of a position detector. The automatic air balancer system further includes a device for temporarily holding as an extension start voltage signal the pressure in the balance cylinder when the piston rod extends and the piston re-enters the working range of the position detector, and a device for outputting the contraction start voltage signal and the extension start voltage signal, which have been temporarily held, when the piston rod reaches a position at the other end of the balance cylinder, and for obtaining a median of the difference between the contraction start voltage signal and the extension start voltage signal and then adding the extension start voltage signal to the median. In addition, the automatic air balancer system includes a device for using a value obtained as a result of the addition of the extension start voltage signal to the median as a balance pressure signal for the balance cylinder, and a device for adding or subtracting another signal to or from the balance pressure signal and for inputting the result of the addition or subtraction to the first pressure control valve.

In the present invention, the above-described another signal may be a signal output from a constant-voltage power supply or a signal output from a variable-voltage power supply.

The arrangement may be such that the signal output from the constant-voltage power supply is added to or subtracted from the balance pressure signal to reciprocate the balance cylinder by the resulting signal, and after a set time has elapsed, a balance pressure signal is generated again.

The automatic air balancer system of the present invention may further include a device whereby the pressure at the one end side or the other end side of the balance cylinder is detected, and when the detected pressure exceeds an upper limit set pressure, an alarm device is activated, and air at the one end side or the other end side of the balance cylinder is confined in the balance cylinder.

It should be noted that the working fluid used in the automatic air balancer system of the present invention is not necessarily limited to air, and that any fluid can be used, whether gas or liquid. The term "air" as used in the present invention means any kind of fluid in the form of gas or liquid.

In regard to the working range of the position detector, it is possible to properly change the operation that takes place when the balance cylinder piston enters the working range and the operation that takes place when the piston comes out of the working range. Such a modified arrangement also falls within the technical scope of the present invention.

In operation of the automatic air balancer system of the present invention, the pressure in the balance cylinder when the piston comes out of the working range of the position detector is temporarily held as an extension start voltage signal, and the pressure in the balance cylinder when the piston re-enters the working range of the position detector is temporarily held as a contraction start voltage signal. When the balance cylinder piston reaches a position at one end of the balance cylinder, the extension start voltage signal and the contraction start voltage signal, which have been temporarily held, are output, and a median of the difference between the extension start voltage signal and the contraction start voltage signal is obtained. Then, the contraction start voltage signal is added to the median. A value obtained as a result of the addition of the contraction start voltage signal to the median is used as a balance pressure signal for the balance cylinder. Either the balance pressure signal or another signal is selected and input to the first pressure control valve. The above-described another signal may be a signal obtained by adding or subtracting a signal output from a constant-voltage power supply or a signal output from a variable-voltage power supply to or from the balance pressure signal.

The balance pressure signal is input to the first pressure control valve to bring the balance cylinder into a balanced state. Next, a signal output from the variable-voltage power supply is added to or subtracted from the balance pressure signal, and the resulting signal is input to the first pressure control valve. Consequently, the pressure in the balance cylinder varies according to the input signal, causing the piston to travel at a desired speed. If the signal output from the constant-voltage power supply is sequentially added to or subtracted from the balance pressure signal and the resulting signal is input to the first pressure control valve, the balance cylinder can perform a sequential operation.

The above and other objects, features and advantages of the present invention will become more apparent from the following description of the preferred embodiments thereof, taken in conjunction with the accompanying drawing.

BRIEF DESCRIPTION OF THE DRAWING

The attached sole figure is a circuit diagram of one embodiment of the present invention.

DESCRIPTION OF PREFERRED EMBODIMENTS

Figure 1:
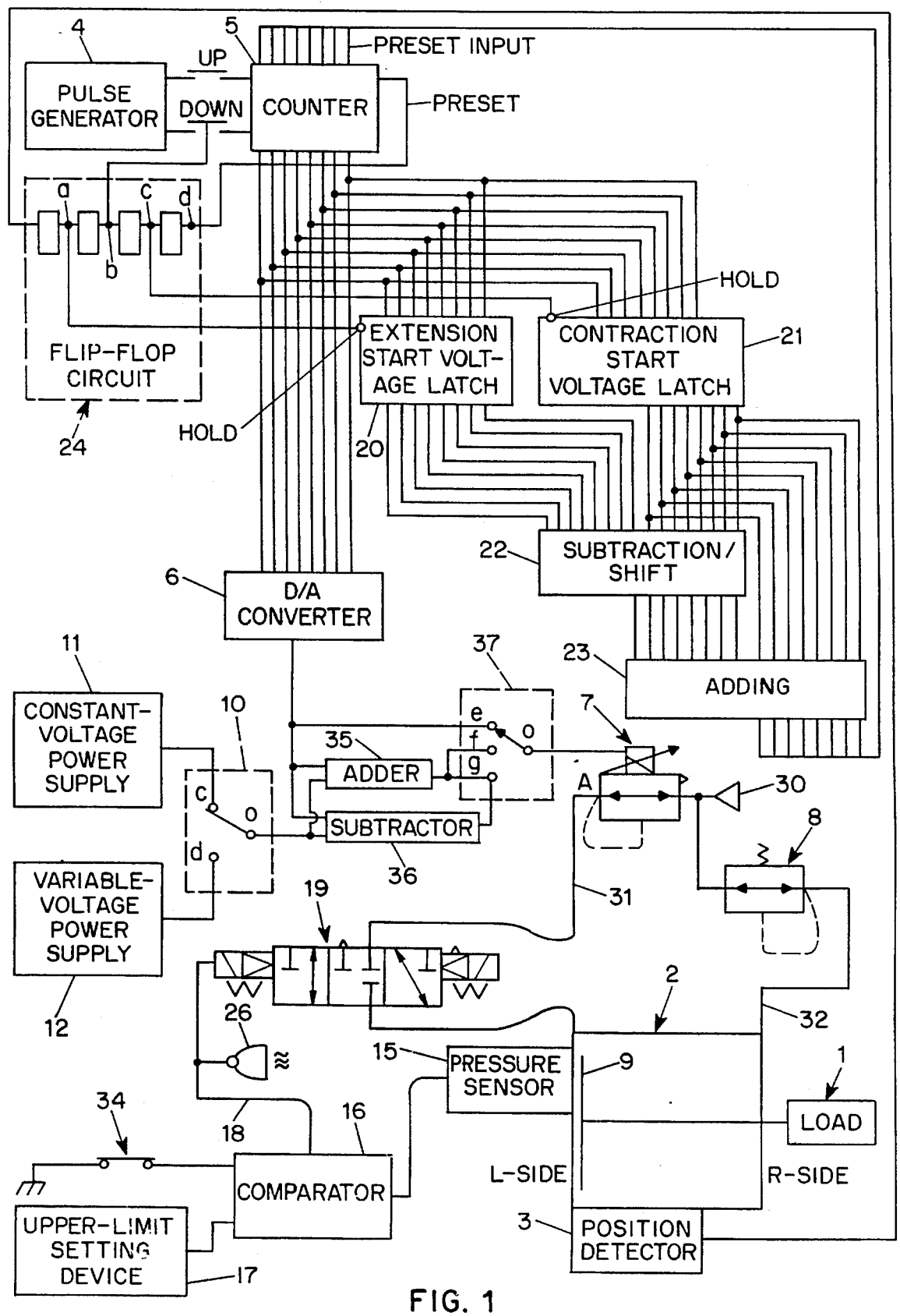

One embodiment of the present invention will be described below in detail with reference to FIG. 1.

A balance cylinder (air cylinder) 2 has a piston 9 slidably fitted therein. The piston 9 and a load 1 are connected together by a piston rod. The piston 9 has a magnet (not shown) secured in an annular grooved provided in the outer periphery thereof. The A-port of a first pressure control valve 7 (electropneumatic converter or electropneumatic proportional valve) is connected to the head-side (H-side) end (i.e., one end) of the balance cylinder 2 through piping 31 and a third control valve 19. The P-port of the first pressure control valve 7 is supplied with air from a pneumatic pressure source 30. The rod-side (R-side) end (i.e., the other end) of the balance cylinder 2 is connected to the A-port of a second pressure control valve 8 through piping 32. The P-port of the second pressure control valve 8 is connected to the pneumatic pressure source 30. A rod-side chamber defined in the balance cylinder 2 is constantly maintained at a pressure set by the second pressure control valve 8. The pressure in a head-side chamber defined in the balance cylinder 2 is at a level determined by the first pressure control valve 7. A position detector (automatic switch) 3 is disposed at the outer periphery of the head-side end portion of the balance cylinder 2. The position detector 3 senses magnetic force from the magnet attached to the piston 9 to detect travel of the piston 9, e.g., starting of travel of it. It should be noted that the position detector 3 has a distance (differential gap) between a position where the position detector 3 is turned on by approach of the piston 9 and a position where it is turned off by travel of the piston 9 in the reverse direction during the next stroke.

The position detector 3 is set as follows: When the piston 9 is at the head-side end position (the left end position as viewed in FIG. 1), the position detector 3 generates an off-signal; when the piston 9 extends and enters the working range of the position detector 3, an on-signal is generated; and when the piston 9 further extends beyond the working range (several mm in general), the position detector 3 generates an off signal. Alternatively, the position detector 3 may be set as follows: When the piston 9 is at the head-side end position, the position detector 3 generates an on-signal (i.e., the head-side end position is included in the working range), and when the piston 9 extends beyond the working range of the position detector 3, an off-signal is generated. The output terminal of the position detector 3 is connected to the input terminal of a flip-flop circuit 24. In the flip-flop circuit 24, an on-signal sequentially shifts from a first-stage output point a to a second-stage output point b, a third-stage output point c, and a fourth-stage output point d according to the number of input signals (on- or off-signals) from the position detector 3. A pulse generator 4 is arranged such that, in its initial state, the output terminal of the pulse generator 4 is connected to the up-terminal of a counter 5, and in response to an on-signal (rise of signal) from the second-stage output point b of the flip-flop circuit 24, the connection of the output terminal of the pulse generator 4 is changed over from the up-terminal to the down-terminal of the counter 5. Further, in response to an off-signal (fall of signal) from the point b, the connection to the down-terminal is cut off. The output terminal of the counter 5 is connected not only to the input terminal of a D/A converter 6 but also to the input terminals of an extension start voltage latch circuit 20 and contraction start voltage latch circuit 21. The output terminal of the first-stage output point a in the flip-flop circuit 24 is connected to the hold terminal of the extension start voltage latch circuit 20. Similarly, the output terminal of the third-stage output point c in the flip-flop circuit 24 is connected to the hold terminal of the contraction start voltage latch circuit 21. The output terminals of the extension and contraction start voltage latch circuits 20 and 21 are connected to the input terminal of a subtraction/shift circuit 22. The output terminal of the contraction start voltage latch circuit 21 and the output terminal of the subtraction/shift circuit 22 are connected to the input terminal of an adding circuit 23. The output terminal of the adding circuit 23 is connected to the preset input terminal of the counter 5. When the output signal from the fourth-stage output point d of the flip-flop circuit 24 turns on, the counter 5 enters a preset state, and the subtraction/shift circuit 22 and the adding circuit 23 are activated to perform calculation. The result of the calculation is input to the counter 5 as preset data. When a fourth signal is input to the flip-flop circuit 24 and thus an on-signal is output from the fourth-stage output point d, the input to the flip-flop circuit 24 is cut off, and the flip-flop circuit 24 will not operate thereafter.

A rotary switch 37 is disposed between the D/A converter 6 and the first pressure control valve 7. The output terminal of the D/A converter 6 is connected to a contact e of the rotary switch 37 and also to the respective input terminals of an adder 35 and subtracter 36. A contact o of the rotary switch 37 is connected to the input terminal of the first pressure control valve 7. The rotary switch 37 further has contacts f and g. The contact f is connected to the output terminal of the adder 35, and the contact g is connected to the output terminal of the subtracter 36. A switch 10 has contacts c, d and o. The contact c is connected to a constant-voltage power supply 11, and the contact d is connected to a variable-voltage power supply 12. The contact o is connected to the respective input terminals of the adder 35 and subtracter 36. By rotating a circuit changeover part of the rotary switch 37, the position of a movable contact of the rotary switch 37 is changed, and thus the contact o is sequentially connected to the contacts e to g. Similarly, by changing the position of a movable contact of the switch 10, the contact o is connected to either the contact c or the contact d. When the balance cylinder 2 is not used, the movable contact of the rotary switch 37 is placed in the position for connection with the contact e. A pressure sensor 15 is disposed at the head-side end of the balance cylinder 2. The pressure sensor 15 is used to measure the head-side pressure in the balance cylinder 2. The output of the pressure sensor 15 is input to a comparator circuit 16. The comparator circuit 16 compares the output of the pressure sensor 15 with the output of an upper-limit pressure setting device 17. The output terminal of the comparator circuit 16 is connected to the input terminal of the third control valve 19 through wiring 18. An alarm 26 is connected to the wiring 18. The A-port of the third control valve 19 is communicated with the head-side end of the balance cylinder 2 through piping. The P-port of the third control valve 19 is connected to the A-port of the first pressure control valve 7 through the piping 31. The R-port of the third control valve 19 is communicated with the atmospheric air. As illustrated in the figure, the third control valve 19 has three positions: a first position where every port is closed; a second position where the A-port is communicated with the P-port; and a third position where the A-port is communicated with the R-port. When an emergency situation, for example, a power failure, occurs, every port is closed to confine the head-side air in the cylinder 2.

Although the balancer mechanism shown in FIG. 1 is designed to balance the weight of the load 1 with the balance cylinder output at the head-side end of the balance cylinder 2, the arrangement can be readily modified so that the weight of the load 1 is balanced at the rod-side end of the balance cylinder 2.

Next, the operation of this embodiment will be explained. It is assumed that before starting of an operation, the power switch (not shown) of the automatic air balancer system is off, and air has been supplied from the pneumatic pressure source 30. At this time, the movable contact of the rotary switch 37 is in the position for connection with the contact e. However, the voltage of the D/A converter 6 is 0 V, and the input signal of the first pressure control valve 7 is zero. Since the third control valve 19 is in an off-state, the piping 31 and the head side of the balance cylinder 2 are cut off from each other. Thus, the head-side pressure air is confined in the balance cylinder 2. The second pressure control valve 8 is always set at a predetermined pressure for reverse travel, so that the pressure in the piping 32 and in the rod-side chamber of the balance cylinder 2 is at a predetermined level for reverse travel. Accordingly, the piston rod lies in the head-side end standby position (contraction position), which is the same as the position assumed by the piston rod at the time of termination of the previous process. Thus, it is possible to prevent undesired movement of the piston 9 which would otherwise cause the piston rod to spring out of the balance cylinder 2. Next, when the power switch of the automatic air balancer system is turned on to initiate an operation, the third control valve 19 is activated to change to the left-hand position as viewed in the figure. Thus, the head-side port of the balance cylinder 2 and the A-port of the first pressure control valve 7 are connected to each other. Since the position of the movable contact of the rotary switch 37 has been changed over to the contact e, a signal from the D/A converter 6 is input to the first pressure control valve 7 through the rotary switch 37. The air pressure (initial pressure) that is output from the first pressure control valve 7 in response to the initial signal (0 V) from the D/A converter 6 is considerably lower than the air pressure (pressure for reverse travel) set by the second pressure control valve 8, and the piston 9 is at the head-side end standby position. Accordingly, undesired movement of the piston 9 is prevented. Thus, there is no likelihood that a work or other object that is secured to the piston rod will be damaged or an operator will be injured by undesired movement of the piston 9.

Next, the load 1 is connected to the piston rod, and the start switch (not shown) is turned on. Consequently, pulses generated by the pulse generator 4 are input to the up-terminal of the counter 5. The pulses are added to the up-side in the counter 5. The output of the counter 5 is sent to the D/A converter 6 where it is converted to an analog voltage proportional to the number of input pulses, and the analog voltage is input to the first pressure control valve 7 through the contact e and the movable contact in the rotary switch 37. At the same time as the start switch is turned on, inputting of the analog voltage, which is proportional to the time elapsed, to the first pressure control valve 7 is started. The first pressure control valve 7 generates an output pressure (pneumatic pressure) proportional to the input analog voltage. Thus, the output pressure of the first pressure control valve 7 gradually rises according to the number of pulses generated from the pulse generator 4, and the head-side pressure in the balance cylinder 2 also rises in proportion to the rise in the output pressure of the first pressure control valve 7.

When the output of the balance cylinder 2 (i.e., the product of the head-side pressure and the head-side pressure-receiving area of the piston 9) becomes larger than the sum of the resistance of the load 1 and [the product of the rod-side pressure and the rod-side pressure-receiving area of the piston 9], the piston rod of the balance cylinder 2 starts to extend (i.e., move rightward as viewed in FIG. 1). When the piston 9 enters the working range of the position detector 3, the output of the position detector 3 changes from an off-signal to an on-signal (detection of extension start). The change of the output signal of the position detector 3 is posted to the flip-flop circuit 24, in which the output at the first-stage output point a changes from an off-signal to an on-signal. In response to the on-signal (rise of signal) from the point a, the extension start voltage latch circuit 20 is activated to store (temporarily hold) an extension start voltage $V_{up}$ signal therein.

When the piston 9 further extends beyond the working range of the position detector 3, the output of the position detector 3 changes from the on-signal to an off-signal, and the output at the first-stage output point a in the flip-flop circuit 24 changes from the on-signal to an off-signal. At the same time, the output at the second-stage output point b changes from an off-signal to an on-signal. In response to the on-signal from the point b, the circuit that has been connected between the output terminal of the pulse generator 4 and the up-terminal of the counter 5 is cut off, but the output terminal of the pulse generator 4 is connected to the down-terminal of the counter 5 instead (contraction start command). Accordingly, the counter 5 starts to add pulses to the down-side (subtraction of output pulses). Thus, the output pressure of the first pressure control valve 7 gradually lowers according to the change in the number of pulses that is output from the counter 5, and the head-side pressure in the balance cylinder 2 also lowers in proportion to the lowering in the output pressure of the first pressure control valve 7.

When the output of the balance cylinder 2 (i.e., the product of the head-side pressure and the head-side pressure-receiving area of the piston 9) becomes smaller than the sum of the resistance of the load 1 and [the product of the rod-side pressure and the rod-side pressure-receiving area of the piston 9], the piston rod of the balance cylinder 2 starts to contract (i.e., move leftward as viewed in FIG. 1). When the piston rod contracts and re-enters the working range of the position detector 3, the output of the position detector 3 changes from the off-signal to an on-signal (detection of contraction start). The change of the output signal of the position detector 3 is posted to the flip-flop circuit 24, in which the output at the second-stage output point b changes from the on-signal to an off-signal, and the output at the third-stage output point c changes from an off-signal to an on-signal. In response to the off-signal from the point b, the circuit that has been connected between the output terminal of the pulse generator 4 and the down-terminal of the counter 5 is cut off, and the cutoff of connection between the output terminal of the pulse generator 4 and the up-terminal of the counter 5 is maintained. That is, the counter 5 performs neither addition nor subtraction. In response to the on-signal (rise of signal) from the point c, the contraction start voltage latch circuit 21 is activated to store (temporarily hold) a contraction start voltage $V_{down}$ signal therein.

When the piston rod further contracts and reaches the head-side end position, the output of the position detector 3 changes from the on-signal to an off-signal. The change of the output signal of the position detector 3 is posted to the flip-flop circuit 24, in which the output at the third-stage output point c changes from the on-signal to an off-signal, and the output at the fourth-stage output point d changes from an off-signal to an on-signal. In response to the on-signal from the point d, the signals which have been stored (temporarily held) in the extension start voltage latch circuit 20 and the contraction start voltage latch circuit 21 are output therefrom, and the subtraction/shift circuit 22 and the adding circuit 23 start their operations. First, the subtraction/shift circuit 22 calculates a difference in voltage between the extension start voltage $V_{up}$ signal from the extension start voltage latch circuit 20 and the contraction start voltage $V_{down}$ signal from the contraction start voltage latch circuit 21 (the voltage difference being considered to be the hysteresis of the system), and shifts the difference voltage one bit in the lower-order direction, thereby obtaining a voltage $\Delta V$ which is half of the difference voltage (i.e., a median of the hysteresis). Then, the adding circuit 23 adds together the contraction start voltage $V_{down}$ signal from the contraction start voltage latch circuit 21 and the voltage $\Delta V$ signal for the hysteresis from the subtraction/shift circuit 22 to output a voltage ($V_{down}+\Delta V$) signal. The voltage ($V_{down}+\Delta V$) signal output from the adding circuit 23 is subjected to predetermined processing in the counter 5 and the D/A converter 6 and then sent to the first pressure control valve 7, in which a balance pressure is set according to the ($V_{down}+\Delta V$) signal. Thus, the head-side pressure in the balance cylinder 2 also becomes equal to the output pressure (balance pressure) of the first pressure control valve 7. It should be noted that the return behavior of the automatic balancer in this embodiment may be appropriately performed in correlation to the use application thereof.

After a balance state of the balance cylinder 2 has been realized, the position of the switch 10 is changed to the contact d, and the position of the movable contact of the rotary switch 37 is changed to the contact f. Consequently, the voltage ($V_{down}+\Delta V$) signal output from the D/A converter 6 and a signal from the variable-voltage power supply 12 are added together in the adder 35, and the result of the addition is input to the first pressure control valve 7. Assuming that the voltage of the variable-voltage power supply 12 is 0 V immediately after the switches 10 and 37 have been actuated to change their positions, since the voltage that is input to the first pressure control valve 7 is the balance pressure signal, the piston 9 maintains the balanced state immediately after the switches 10 and 37 have been actuated. Thereafter, as the voltage that is input to the first pressure control valve 7 from the variable-voltage power supply 12 is raised, the head-side pressure in the balance cylinder 2 rises, causing the piston 9 to extend. Next, when the position of the rotary switch 37 is changed to the contact g, the voltage ($V_{down}+\Delta V$) signal output from the D/A converter 6 and the signal from the variable-voltage power supply 12 are subtracted one from the other in the subtracter 36, and a signal indicating the result of the subtraction is input to the first pressure control valve 7. Consequently, the output pressure of the first pressure control valve 7 lowers, and hence the head-side pressure in the balance cylinder 2 lowers, causing the piston rod to contract. The operator can move the load 1 to a desired position by manually adjusting the output voltage of the variable-voltage power supply 12 and actuating the rotary switch 37 while watching the position of the load 1. At this time, the speed of travel of the piston 9 can be controlled by setting the difference between the pressures in front of and behind the piston 9 at a desired value. When the piston 9 reaches a given position, the position of the movable contact of the rotary switch 37 is changed to the contact e. Consequently, a balance pressure signal is input to the first pressure control valve 7, and thus the piston 9 is suspended.

When it is desired to apply constant force to a belt or the like which moves continuously, the position of the switch 10 is changed to the contact d, and the position of the movable contact of the rotary switch 37 is changed to the contact f. In this state, a roller is secured to the distal end of the piston rod and disposed to face a belt, for example. Next, the output voltage of the variable-voltage power supply 12 is set at a value obtained by experiment, for example. Consequently, the adder 35 adds together the voltage ($V_{down}+\Delta V$) signal output from the D/A converter 6 and the voltage of the variable-voltage power supply 12. A signal indicating the result of the addition is input to the first pressure control valve 7. Thus, the head-side pressure in the balance cylinder 2 is made equal to the set pressure. As a result, the piston rod extends, causing the roller to come in contact with the belt. Thus, a force which is determined by the difference in pressure and area between both sides of the piston 9 in the balance cylinder 2 is applied to the belt through the roller.

It is also possible to move the piston 9 of the balance cylinder 2 by fixing the output voltage using the constant-voltage power supply 11. For example, when press fitting is to be carried out, the position of the switch 10 is changed to the contact c, and the position of the rotary switch 37 is changed to the contact g. Consequently, the output ($V_{down}+\Delta V$) of the D/A converter 6 and the voltage of the constant-voltage power supply 11 are subtracted one from the other in the subtracter 36, and the output of the subtracter 36 is input to the first pressure control valve 7, causing the piston 9 to lie in the head-side end standby position. At this time, a tool is secured to the distal end of the piston rod, and the position of the rotary switch 37 is changed to the contact f. Consequently, the output ($V_{down}+\Delta V$) output of the D/A converter 6 and the voltage of the constant-voltage power supply 11 are added together in the adder 35, and a voltage obtained as a result of the addition is input to the first pressure control valve 7, causing the piston rod to extend. Thus, the tool is brought into contact with an object to be press-fit, and then the object is pushed by the tool and press-fit into a recess where it is to be installed by a predetermined force. When the position of the rotary switch 37 is returned to the contact g after a set time has elapsed, the output ($V_{down}+\Delta V$) of the D/A converter 6 and the voltage of the constant-voltage power supply 11 are subtracted one from the other in the subtracter 36, and a voltage obtained as a result of the subtraction is input to the first pressure control valve 7, causing the piston 9 to return to the head-side end standby position. In this way, a sequential operation of the balance cylinder 2 is realized, and the sequential operation can be performed continuously. It should be noted that the force for press fitting can be varied by changing the constant-voltage power supply 11 according to the kind of object to be press-fit. Therefore, there is no likelihood that the object of press fitting will be destroyed. It is also possible to arrange the system such that a pneumatic chuck is activated by the balance cylinder 2 instead of the press-fitting operation by the balance cylinder 2. That is, the clamping force of the pneumatic chuck can be varied by changing the signal that is input to the first pressure control valve 7 in the same way as in the case of the press-fitting operation.

The above-described press-fitting operation can be further improved in safety by using the third control valve 19. That is, the highest level of the head-side pressure in the balance cylinder 2 that is required for the press-fitting process is predetermined, and the highest pressure is set in the upper-limit pressure setting device 17. If the head-side pressure in the balance cylinder 2 exceeds the predetermined highest pressure on account of an accident or trouble of the system during the press-fitting operation, a danger signal is output from the comparator circuit 16, causing the alarm 26 to be activated. At the same time, the third control valve 19 is rapidly activated to return to the position illustrated in the figure, thereby confining the balance cylinder head-side air in the cylinder 2. Thus, a dangerous situation can be immediately avoided.

It is also possible to measure the weight of a load as follows: The balance cylinder 2 is vertically disposed with the rod-side end facing upward. A load to be measured is placed on the piston rod, and the system is made to balance with the load. After a balanced state has been realized, the output signal of the pressure sensor 15 is input to a display (not shown), and the weight of the load is read from the display.

If a power failure or other accident occurs, the third control valve 19 turns off to confine the cylinder head-side pressure air in the balance cylinder 2. Accordingly, the balance cylinder 2 is suspended in the balanced state. Thus, safety is ensured.

The balance cylinder 2 may be provided with a brake device. The pressure required for a braking operation can be automatically obtained by setting the pressure of air used for releasing the brake so that the air pressure matches the above-described balance pressure (i.e., a pressure control valve is disposed in a braking air supply circuit, and the balance pressure signal is input to the pressure control valve). Thus, the lifetime of the brake can be extended. It should be noted that the conventional practice is to adjust the pressure of braking air by actuating a manually-operated pressure control valve every time the load changes.

According to the automatic air balancer system of the present invention, the pressure in the balance cylinder when the travel distance of the piston exceeds the differential gap of the position detector is temporarily held as an extension start voltage signal, and the pressure in the balance cylinder when the piston enters the working range of the position detector is temporarily held as a contraction start voltage signal. When the piston of the balance cylinder reaches one end position, the extension start voltage signal and the contraction start voltage signal, which have been temporarily held, are output, and a median of the difference between the extension and contraction start voltage signals is obtained. Then, the contraction start voltage signal is added to the median, and the result of the addition is used as a balance pressure signal for the balance cylinder. Since a starting resistance is determined by the above-described simple learning, even if the starting resistance changes, it is possible to automatically set a balance cylinder pressure at which the applied load, which may be diversified, and the balance cylinder output balance with each other.

The balance pressure signal, or a signal obtained by adding or subtracting a signal output from a constant-voltage power supply to or from the balance pressure signal, or a signal obtained by adding or subtracting a signal output from a variable-voltage power supply to or from the balance pressure signal is input to a first pressure control valve to thereby control the pressure in the balance cylinder. Accordingly, it is possible to maintain various kinds of load at a predetermined position and then move the load at a desired speed, or apply a desired mechanical force to various kinds of object while preventing the piston rod from springing out of the balance cylinder. When the pressure in the balance cylinder exceeds a predetermined level, it is possible to activate an alarm and confine the pressure air in the cylinder.

Although the present invention has been described by way of embodiments, it should be noted that the present invention is not necessarily limited to the described embodiments and that various changes and modifications may be imparted thereto without departing from the scope of the invention which is limited solely by the appended claims.

What is claimed is:

1. An automatic air balancer system comprising:
   (a) means for controlling a pressure at one end side of a balance cylinder to a desired level by a first pressure control valve and for controlling a pressure at the other end side of said balance cylinder to a predetermined level by a second pressure control valve;
   (b) means for obtaining a balance pressure signal for said balance cylinder; and
   (c) means for adding or subtracting another signal to or from said balance pressure signal and for inputting the result of the addition or subtraction to said first pressure control valve;
   wherein said another signal is a signal output from a constant-voltage power supply or a signal output from a variable-voltage power supply.

2. An automatic air balancer system comprising:
   (a) means for controlling a pressure at one end side of a balance cylinder to a desired level by a first pressure control valve and for controlling a pressure at the other end side of said balance cylinder to a predetermined level by a second pressure control valve;
   (b) means for temporarily holding as an extension start voltage signal a pressure in said balance cylinder when a piston rod of said balance cylinder extends and a piston of said balance cylinder comes out of a working range of a position detector;
   (c) means for temporarily holding as a contraction start voltage signal a pressure in said balance cylinder when said piston rod contracts and said piston re-enters the working range of said position detector;
   (d) means for outputting the extension start voltage signal and the contraction start voltage signal, which have been temporarily held, when said piston rod reaches a position at the one end of said balance cylinder, and for obtaining a median of a difference between the extension start voltage signal and the contraction start voltage signal and then adding the contraction start voltage signal to said median;
   (e) means for using a value obtained as a result of said addition of the contraction start voltage signal to said median as a balance pressure signal for said balance cylinder; and
   (f) means for adding or subtracting another signal to or from said balance pressure signal and for inputting the result of the addition or substraction to said first pressure control valve;
   wherein said another signal is a signal output from a constant-voltage power supply or a signal output from a variable-voltage power supply.

3. An automatic air balancer system comprising:
   (a) means for controlling a pressure at one end side of a balance cylinder to a predetermined level by a second pressure control valve and for controlling a pressure at the other end side of said balance cylinder to a desired level by a first pressure control valve;
   (b) means for temporarily holding as a contraction start voltage signal a pressure in said balance cylinder when a piston rod of said balance cylinder contracts and a piston of said balance cylinder comes out of a working range of a position detector;
   (c) means for temporarily holding as an extension start voltage signal a pressure in said balance cylinder when said piston rod extends and said piston re-enters the working range of said position detector;
   (d) means for outputting the contraction start voltage signal and the extension start voltage signal, which have been temporarily held, when said piston rod reaches a position at the other end of said balance cylinder, and for obtaining a median of a difference between the contraction start voltage signal and the extension start voltage signal and then adding the extension start voltage signal to said median;
   (e) means for using a value obtained as a result of said addition of the extension start voltage signal to said median as a balance pressure signal for said balance cylinder; and
   (f) means for adding or subtracting another signal to or from said balance pressure signal and for inputting the result of the addition or substraction to said first pressure control valve;
   wherein said another signal is a signal output from a constant-voltage power supply or a signal output from a variable-voltage power supply.

4. An automatic air balancer system according to claim 1, 2 or 3 further comprising:
   means for performing an operation such that the signal output from said constant-voltage power supply is sequentially added to or subtracted from said balance pressure signal, and the resulting signal is input to said first pressure control valve to reciprocate said balance cylinder, and that, after a set time has elapsed, said balance pressure signal is input to said first pressure control valve; and
   means for detecting the pressure at the one end side or the other end side of said balance cylinder, and for activating, when the detected pressure exceeds an upper limit set pressure, an alarm device, and confining air at the one end side or the other end side of said balance cylinder in said balance cylinder.

5. An automatic air balancer system according to claim 1, 2 or 3 further comprising:
   means for performing an operation such that the signal output from said variable-voltage power supply is sequentially added to or subtracted from said balance pressure signal, and the resulting signal is input to said first pressure control valve to reciprocate said balance cylinder, and that, after a set time has elapsed, said balance pressure signal is input to said first pressure control valve; and
   means for detecting the pressure at the one end side or the other end side of said balance cylinder, and for activating, when the detected pressure exceeds an upper limit set pressure, an alarm device, and confining air at the one end side or the other end side of said balance cylinder in said balance cylinder.

* * * * *